United States Patent [19]

Zehrung, Jr. et al.

[11] 4,068,455
[45] Jan. 17, 1978

[54] BAG FOR A LAWN COMBER

[75] Inventors: Claude D. Zehrung, Jr., Lakewood; Clarence L. Urie; Joseph C. Martinez, both of Denver, all of Colo.

[73] Assignee: Bluebird International, Inc., Englewood, Colo.

[21] Appl. No.: 658,420

[22] Filed: Feb. 17, 1976

[51] Int. Cl.² .......................................... A01D 43/02
[52] U.S. Cl. ........................................ 56/344; 56/16.1
[58] Field of Search ................. 56/16.6, 16.7, 13.2, 56/15.9, 16.1, 400.02, 400.13, 344, 202

[56] References Cited

U.S. PATENT DOCUMENTS

| 2,959,904 | 11/1960 | Ferris | 56/344 |
| 3,893,284 | 7/1975 | Thon | 56/202 |
| 3,962,852 | 6/1976 | Boyer | 56/202 |
| 3,998,034 | 12/1976 | Rubin | 56/11.3 |

FOREIGN PATENT DOCUMENTS 1,407,217  9/1975  United Kingdom .................. 56/202

*Primary Examiner*—Russell R. Kinsey
*Attorney, Agent, or Firm*—Van Valkenburgh and Lowe

[57] ABSTRACT

The invention disclosed herein is a debris bag for a push-type lawn comber. Such a lawn comber is representative of similar devices such as lawn mowers and sweepers, in are provided with a rearwardly extended push handle. The lawn comber carries an array of radial impact arms upon a transverse shaft within the body of the comber. Rotation of the shaft and impact arms upon it by a power drive throws debris through a chute at the rear of the machine. A bag is carried upon a frame which latches itself to the chute and cantilevers rearwardly from the chute to define the top of the bag. A closure cover fits over this bag top to enclose it when the unit is n operation. A lever is used to engage the impact arm shaft with the power drive. Whenever the lever is depressed rearwardly alongside the bag, engagement occurs. A finger on the bag frame holds the lever in place and thus sustained engagement of the shaft impact arm shaft with the power drive is not possible unless the bag is in proper position upon the lawn comber.

9 Claims, 11 Drawing Figures

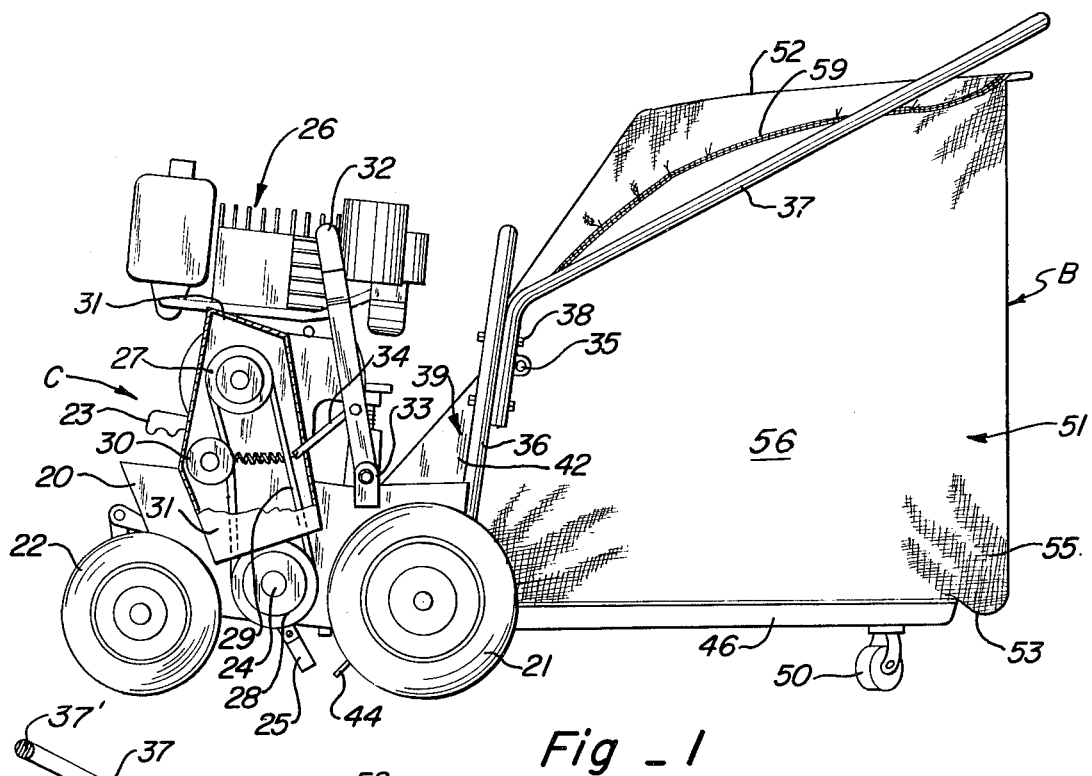
Fig _ 1
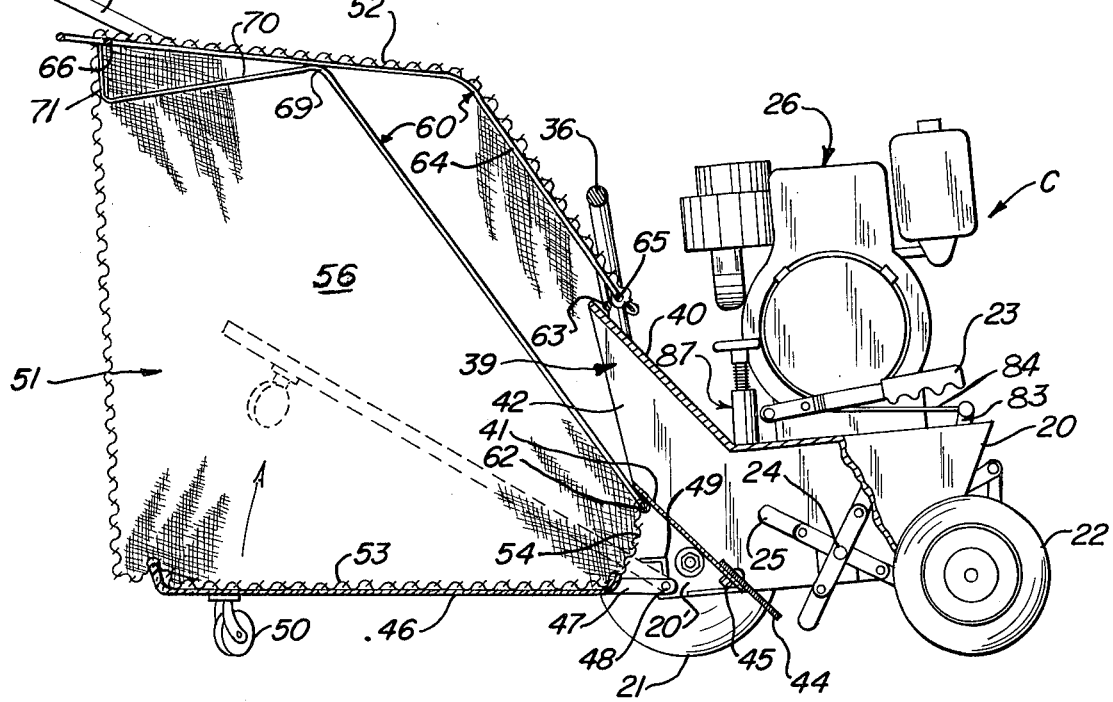
Fig _ 2

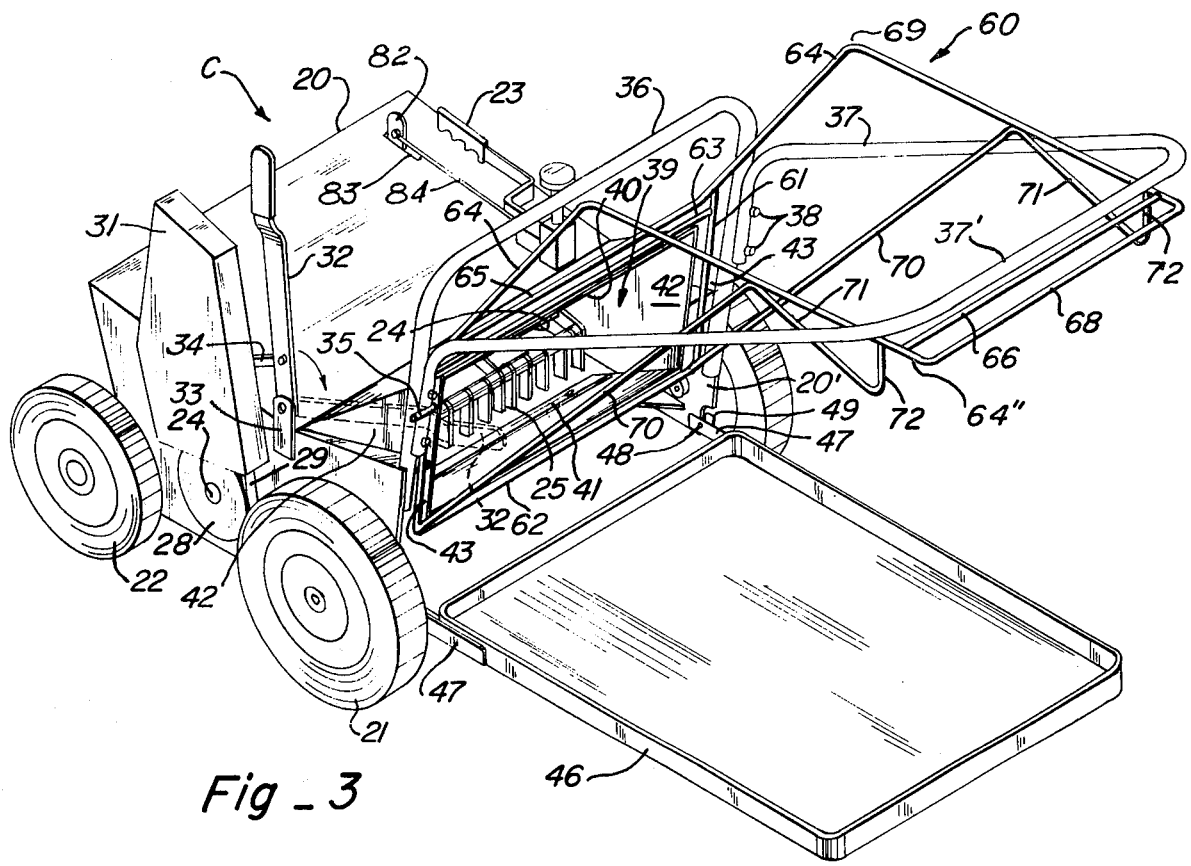
Fig_3
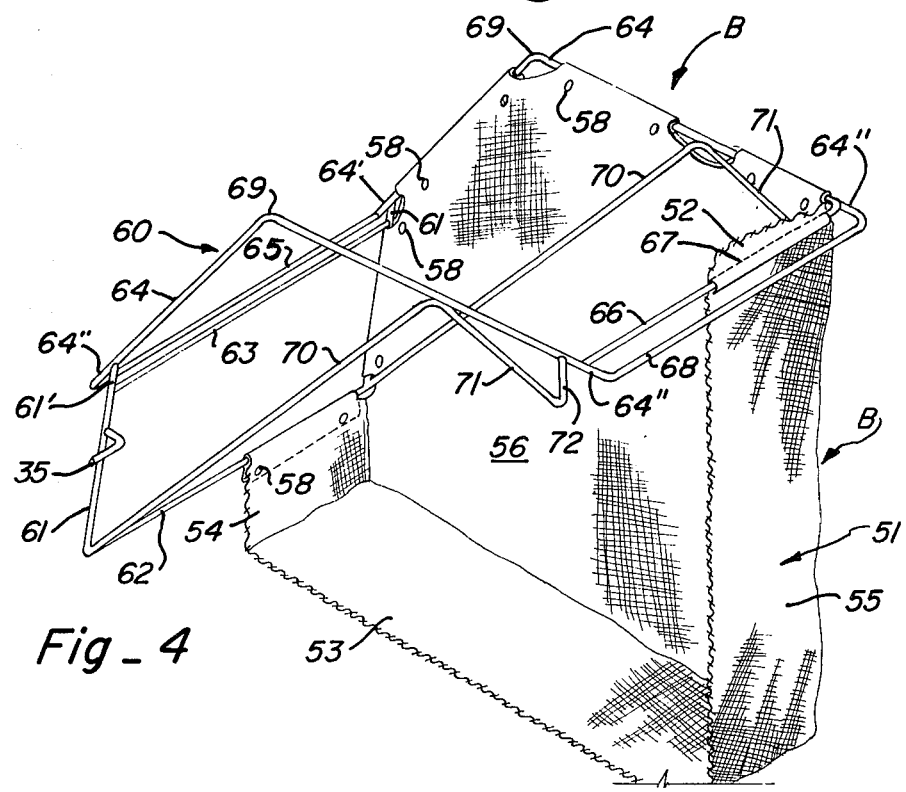
Fig_4

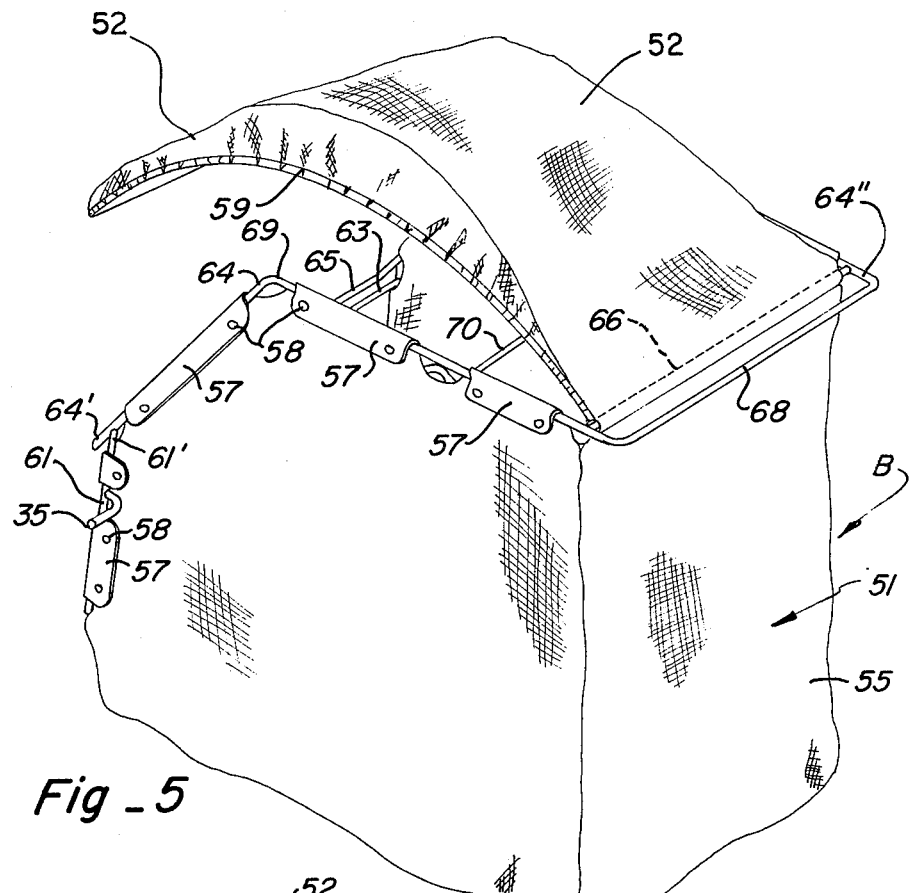
Fig_5
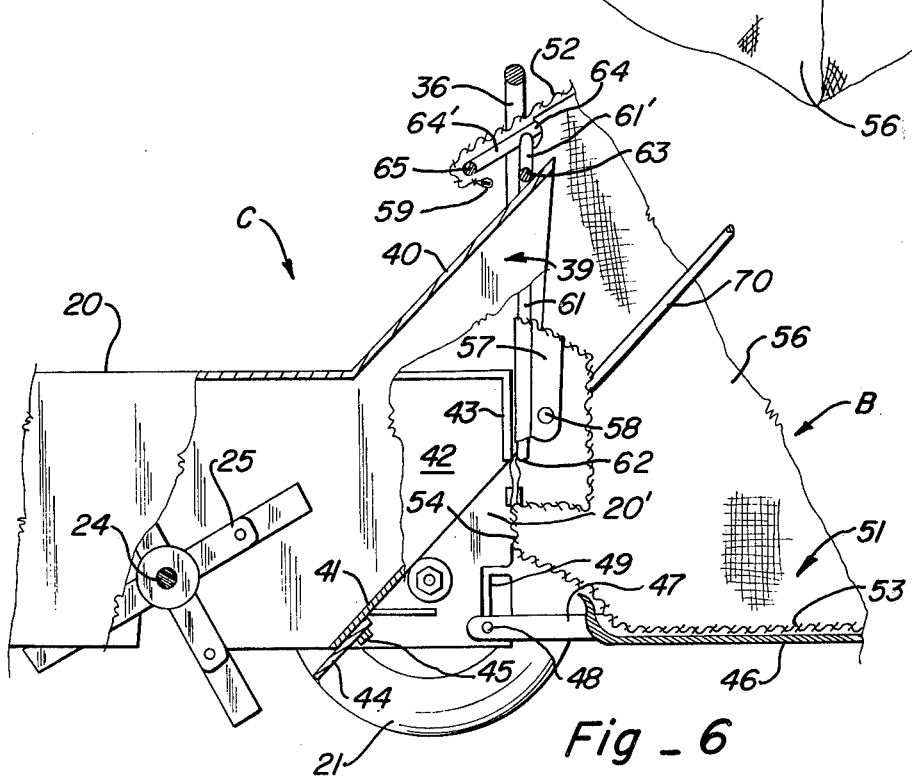
Fig_6

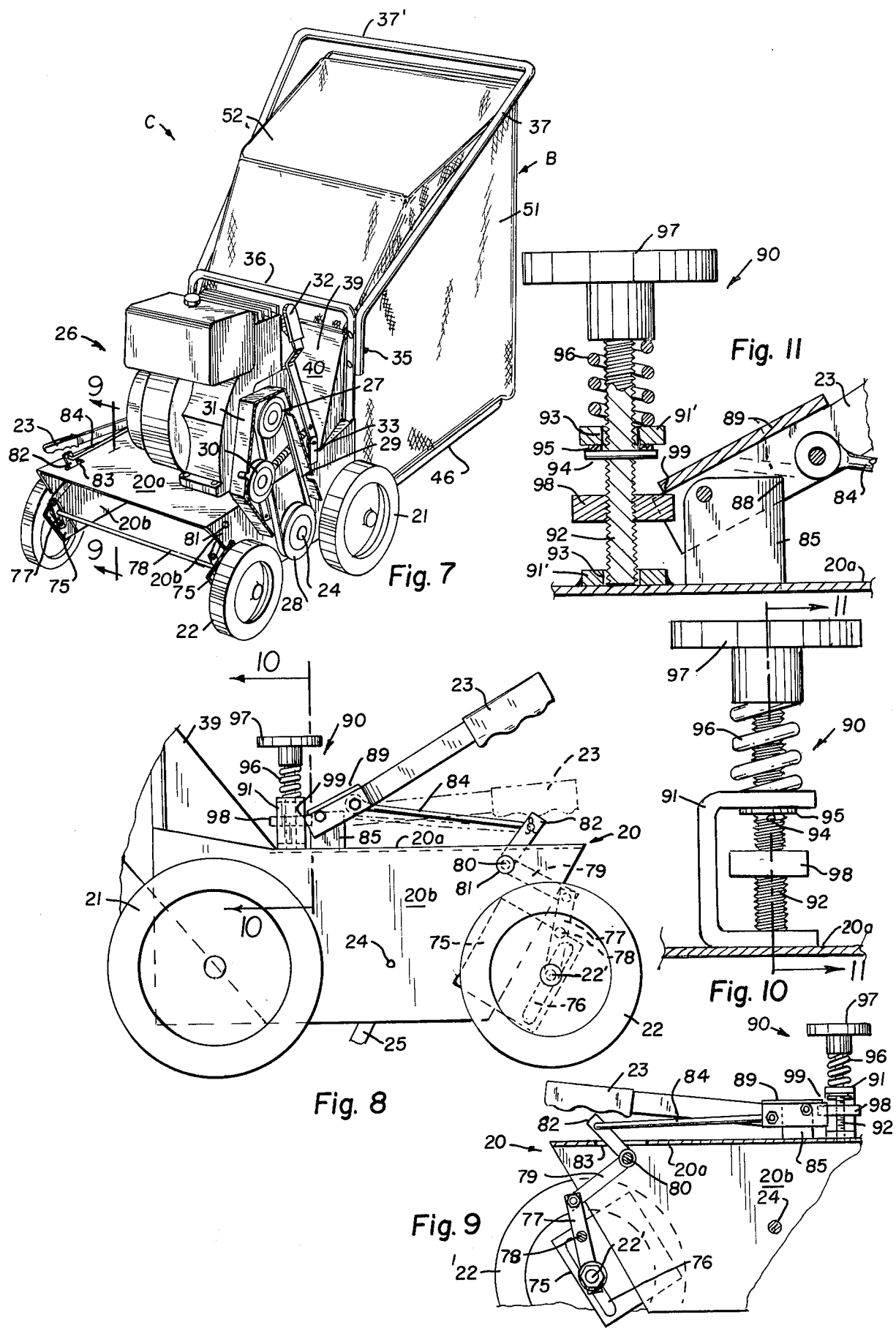

BAG FOR A LAWN COMBER

The present invention relates to debris catch bags for yard care equipment such as lawn mowers, sweepers and lawn combers.

A primary object of the invention is to provide a novel and improved debris catch bag which is especially adapted to use with powered yard care equipment of the type which throws the debris, such as lawn cuttings, trash and dead grass through a chute at the rear of the apparatus.

With such apparatus, the debris catch bag, hereinafter sometimes called "bag" is mounted at the exit of the chute in a simple, effective manner as hereinafter set forth. As illustrative of this advantageous arrangement, the preferred embodiment of the invention, hereinafter disclosed in detail, exemplifies the bag as being used with a lawn comber, and the same will be hereinafter described in combination with the comber; however, it is to be understood that the invention can be adapted for use with any other similar type of yard care equipment which throws the debris through a rearward discharge chute, including lawn mowers and sweepers.

Another object of the invention is to provide a novel and improved debris catch bag which, when mounted upon the discharge chute of a lawn comber, or the like, may be completely enclosed to eliminate the chance of some of the dead grass, cuttings and the like from being thrown out of the bag when the apparatus is in use.

Another object of the invention is to provide a novel and improved debris catch bag for a lawn comber or the like which may be opened for the emptying of its contents, either with the bag on the comber or with the bag removed from the comber.

Another object of the invention is to provide, for a lawn comber having a modified discharge chute, an improved catch bag which can be quickly and easily mounted upon and dismounted from the lawn comber, and to also provide an improved catch bag having a framework which extends along the top of the bag and cantilevers rearwardly from its connection at the discharge chute of the lawn comber to support the bag therebeneath, and with the bag and its framework being embraced within but being supported independently of the rearwardly extended operator's push handle of the comber.

Another object of the invention is to provide a novel and improved debris catch bag formed upon a cantilevered framework extended along the top of the bag to permit the bag to easily collapse should the body of the comber, whereon the bag is mounted, be tipped rearwardly and upon the bag.

Another object of the invention is to provide a novel and improved debris catch bag for a lawn comber, and the like, which includes a support pan trailing the comber to support a loaded bag eliminating strain upon and unbalanced operation of the comber which would otherwise occur.

Another object of the invention is to provide a novel and improved debris catch bag for a lawn comber which will not depend upon adjustments to the comber for proper functioning and yet which may be easily arranged, in conjunction with the controls of the lawn comber to prevent operation of the comber unless the bag is properly placed upon the discharge chute of the comber.

Another object of the invention is to provide, in a lawn comber or the like, a simplified, reliable, easily operated adjusting mechanism for lowering the lawn comber to engage the combing mechanisms to the ground and raising the lawn comber to disengage the combing mechanisms from the ground, and which provides further, a simple lock mechanism which is positive, wear-free and will not shift due to vibration.

Other objects of the invention are to provide a novel and improved debris catch bag for, and in combination with, a lawn comber, or the like, which is a simple, rugged, economical, durable and easy-to-use structure.

With the foregoing and other objects in view, all of which more fully appear, the present invention comprises certain constructions, combinations and arrangements of parts and elements, as hereinafter described, defined in the appended claims and illustrated in the accompanying drawings in which:

FIG. 1 is a left-side, side elevational view of a lawn comber having an improved debris catch bag mounted thereon, the lawn comber being arranged to receive the bag, and also arranged to be operative only when the bag is in place.

FIG. 2 is a right side, side elevational view of the lawn comber and bag shown in FIG. 1, but with portions being in section to illustrate arrangements and components not otherwise shown.

FIG. 3 is an isometric view looking towards the rear, left side of the lawn comber, but with the lawn comber engine removed and with only the framework of the debris bag being mounted upon the comber.

FIG. 4 is an isometric view, looking as in FIG. 3, of the debris bag frame per se, but with only a portion of the debris bag cloth upon the frame.

FIG. 5 is an isometric view, similar to FIG. 4, but with the bag cloth in place and with the top cover of the bag being above the bag in an open position.

FIG. 6 is a fragmentary side elevational view as from the left side of the unit, but mostly in section to show parts otherwise hidden from view.

FIG. 7 is a perspective view looking towards the front and left side of the lawn comber to better illustrate a wheel-system to raise and lower the lawn comber, for engagement of the combing elements within the comber, with the ground.

FIG. 8 is a right side elevational view similar to a portion of FIG. 2, but with broken lines indicating parts hidden from view and dashed lines indicating alternate positions of a hand lever.

FIG. 9 is a fragmentary sectional detail as taken from the indicated line 9—9 at FIG. 7, but on an enlarged scale.

FIG. 10 is a fragmentary sectional detail as taken from the indicated line 10—10 at FIG. 8, but on an enlarged scale.

FIG. 11 is a fragmentary sectional detail as taken from the indicated line 11—11 at FIG. 10.

Referring more particularly to the drawing, the preferred embodiment shown therein is illustrated as being used with a lawn comber C having its discharge section and a control arm modified to accept the improved bag B. Otherwise, the lawn comber C is a conventional unit having an open-bottom, box-shaped frame 20 of a suitable size for easy handling, for example, a frame 24-inches square and 10-inches deep is the approximate proportion of a good operational unit. This frame is mounted upon fixed rear wheels 21 and adjustable front wheels 22 which may be lowered to raise the front end of the frame, or lifted to lower the front end. This raising and lowering is effected by an improved adjustable lift lever 23 at one side of the machine as hereinafter further described.

A transversely disposed shaft 24, mounted in bearings, not shown, extends across the frame, at the approximate central position inside the frame, to carry an array of radial, articulated impact arms 25. As the shaft 24 and arms 25 thereon rotate, the arms strike the ground surface below the comber C when it is lowered to a proper position to effectively comb a lawn, remove dead grass and break up clumps.

An engine 26, ordinarily a conventional, single cylinder gasoline engine, is mounted upon the top of the frame 20, at one side thereof, so that its drive shaft overhangs the side of the frame to be belt connected to the end of the shaft 24 therebelow. A driver pulley 27 on the output shaft of the engine and a driven pulley 28 on the shaft 24 are connected by a loosely fitting belt 29. A take-up idler pulley 30 is mounted in a slide, not shown, at one side of the belt to shift across the path of the belt to tighten the belt on the pulleys 27 and 28, this being a simple clutch mechanism to engage the shaft 24 with the engine. This belting assembly is encased in a cover 31 which is partially broken away at FIG. 1 to illustrate the components within it.

The movement of idler pulley 30 to tighten the belt 29 upon pulleys 27 and 28 is effected by a hand lever 32 pivotally secured to an ear 33 upstanding from the side of the frame. The lever 32 connects with the idler pulley 30 by a rod and spring 34. This hand lever normally upstands from the ear 33, as shown at FIG. 1, and is pulled rearwardly and downwardly to tighten the belt upon the pulleys 27 and 28 for driving shaft 24. At the pulley tightening position the lever is partly depressed and will be latched in position by a finger 35 outstanding from one side of the debris bag B, as best shown in broken lines at FIG. 3. The finger 35 is carried by the debris bag B and the lever 32 cannot be latched in the shaft-driving-position by any stop other than the finger 35. This results in a fail-safe arrangement to prevent operation of the comber unless the bag B is properly mounted upon the lawn comber C.

The comber C thus far described is essentially conventional; however, several other features are specially designed to adapt it for use with the improved bag B, including the positioning of the lever 32 above described. The rearward edge of the body 20 carries an upstanding, arched yoke 36 which extends transversely across the body section. A rearwardly extended, upwardly sloped, U-shaped push handle 37 is secured to the legs of this yoke as by bolts 38. An upwardly inclined, rearwardly directed discharge chute 39 lies between the legs of the yoke 36 at the rear of the frame 20 at a position where the rotating impact arms 25 will most effectively throw debris. This discharge chute is formed by upper and lower, inclined plates 40 and 41 respectively, and sidewall plates 42. The sidewall plates converge rearwardly slightly to form a space between them and the upstanding legs of the yoke 36. The space between the sidewall plates 42 and the yoke legs is partially closed by a short, rear-wall abutment 43 best shown at FIGS. 3 and 6. An extension plate 44 is adjustably mounted at the bottom of the lower plate 41 of the chute, as by bolts 45, to reach to the ground and effectively deflect all rearwardly thrown debris into the chute 39 and not under the machine.

To complete the comber structure, so that it may better carry the bag B, a support pan 46 is swingably attached to the rear of the comber by arms at each side of the pan 47. These arms 47 include pivot bolts 48 which fit into bayonet slots 49 at the rearward edge of the wall portions 20' of the frame 20 at each side. The rearward end of the pan is supported upon a pair of caster wheels 50 which easily shift and turn to follow any maneuver which may be made with the comber. The pan can follow the movement of the comber and, it can also swing upwardly about the pivot bolts 48, as indicated in broken lines at FIG. 2, or permit the comber to tip rearwardly upon the pan permitting the bag B to fold upon itself. The bayonet slots 49 permit the pan to be removed if it is not needed.

The bag B includes a tough, cloth body 51 carried upon a framework hereinafter described, and a cloth cover 52 of a suitable material such as a nylon or canvas. This bag body 51 is formed by folding and sewing cloth portions to include a floor section 53, a short front wall 54, a back wall 55 and side wall sections 56. The proportions of these sections are such that the floor section 53 will rest upon the pan 45 with the front wall 54 extending to a framework member at the lower exit edge of the discharge chute 39. The rear wall 55 extends upwardly to a framework member or a point near the cross bar 37' of the push handle 37 and the sidewalls 56 are trapezoidal in form to join the floor, front wall and rear wall with their top edges extended to framework members commencing at the upper exit edge of the discharge chute 39, and thence rearwardly and upwardly to the top edge of the rear wall 55. These edges and other edges include overfolding flaps 57, FIG. 5 and snaps 58 to attach the cloth body to the framework as further described.

The cloth cover 52 is attached to the upper edge of the rear wall 55 and hinges at this edge to swing forwardly to enclose the open top of the body 51. This cover 52 is essentially rectangular in form, wide enough to overlap sides of the body 51 and a front rod of the bag framework as will be described. The side edges and front edges of this cover are sewn to form a piping 59 which carries an elastic band to permit it to be closed over the body 51 by a simple, resilient fitting in the same manner as a garter fits upon an individual's leg.

The bag framework 60, holding the body 51, is made of rigid rods which embrace the rear portion of the discharge chute and cantilever rearwardly therefrom to hold the top edges of the sidewalls 56 and rear wall 55 in place. This framework 60 thus includes a mounting panel having a mouth portion formed by a pair of upright rods 61, a transverse bottom rod 62 and a transverse top rod 63. This mouth portion of the panel is proportioned to fit over the exit of the discharge chute 39 with the upright rods being held against the rear wall abutment portion 43 or any similar component if the abutment 43 is not used. Since the cantilevered arrangement of this frame will tend to rotate about this framework mounting panel whenever the frame is in place upon the discharge chute, it is apparent that the rearward upslope of the upper plate 40, of the discharge chute 39, locks the top rod 63 of the mounting panel in place, as best shown at FIG. 6.

As best shown at FIG. 4, the other components of the framework include a pair of upwardly and rearwardly extended longitudinal top rods 64, each of which is connected to the top of its respective upright rod 61 a short distance above the transverse top rod 63. This connection is thus upon a short extension 61' of the rod 61 above the transverse top rod 63 and each top rod 64 extends a short distance 64' forwardly of the connection with the extension 61' to turn and join with its opposing top rod 64 as a transverse connector rod 65 positioned near and forwardly of the transverse top rod 63 to receive the front edge of the cover cloth 52, as shown at FIG. 6. Each top rod 64 extends rearwardly on a slope and upwardly from the connection with its respective rod 61, thence to dip to a more nearly horizontal reach to a rear cross rod 66 connecting the rear end of each top rod 64 and forming a support for the top edge of the back wall 55, this back wall being attached thereto as by stitching 67 or in any other suitable manner. Each top rod 64 extends rearwardly a short distance beyond the rear cross rod 66 as an extension 64" to connect with a second cross rod handle 68 connecting the ends of the two extensions 64", the handle 68 serving to facilitate handling the bag when it is removed from the comber. Each top rod 64 is preferably formed with an intermediate hump 69 at its turn point near the approximate forward one-third point of the rod 64 to increase the effective volume of the bag B and to better receive the cover 52. The side wall sections 56 of the cloth body are thus formed in a like manner with individual flaps 57 and snaps 58 connecting these sidewall sections to the top rods 64.

This framework includes a strut rod 70 connecting at each corner at the junction of the transverse bottom rod 62 and an upright rod 61. Thence, each strut rod 70 extends rearwardly and upwardly to join with the top rod 64 thereabove at a location near the approximate rear 1/3 point of the rod 64 where it is secured to the top rod as by welding. Thence, the strut rod extends rearwardly underneath the top rod as a triangular reach 71 to turn upwardly as at 72 to join with the top rod near the rear corner of the bag. Flaps 57 and attaching snaps 58 are provided at the edges of the bag body 51, to join the edges of the framework consisting of the upright rods 51 and the transverse bottom rod 62 to complete the attachment of the bag body 51 to the framework 60. To complete the unit, the finger 35 is attached to the proper upright rod 61 for control of the operation of the unit with the lever 32.

In operation of this arrangement, this bag B is placed upon the exit of the discharge chute 39 as heretofore described, with the bottom of the bag resting upon the pan 46. The cover 52 is then fitted over the top of the bag and the unit is ready for use. Depression of handle 32 starts the comber and the handle will be locked in the operative position by engaging the finger 35. Prior to or subsequently, the left lever 23 is raised to lower the front end of the machine and it is ready for operation. Dead grass and clump particles cut by the rotating arms 25 are thrown through the chute 39 and into the bag. When the bag is full, rotation of the impact arms 25 is stopped and the bag is removed by simply lifting it off the machine. The cover 52 may then be removed, the bag emptied, and then replaced upon the machine.

FIGS. 7 - 11 illustrate in detail the levers which lower and raise the adjustable front wheels 22 to raise and lower the arms 25 from and to contact with the ground surface as for combing a lawn. The body 20 of the frame is formed, essentially, as a folded member having a flat top 20a, depending sidewalls 20b and an open front. The front edge of each sidewall 20b is extended by an ear 75, preferably a plate of metal welded to the sidewall which is heavier than the sidewall material to provide for an axle-supporting slot 76 to shiftably carry the axle 22' of the adjacent front wheel 22. The axle 22' of each front wheel 22 connects with thrust links 77 and each of the thrust links 77, at opposite sides of the machine, is connected to the other by a cross rod 78.

Each thrust link 77 extends upwardly to connect with the end of a lever arm 79 and each lever arm 79 is secured to a transverse shaft 80 pivotally mounted to the sidewalls 20b of the frame 20 directly beneath the top 20a of the frame, as at 81. It follows that rotation of this shaft 80 to lift the lever arm 79 and link 77 lifts the wheels 22 with respect to the frame to lower the frame with respect to the ground, the working position of the machine. Rotation of this shaft 80 to drop the lever arm and link lowers the wheels with respect to the frame to raise the frame with respect to the ground, the idling position of the machine.

Rotation of the shaft 80 is effected by a lever 82 upstanding from the shaft 80 through a slot 83 in the frame top 20a. This lever arm 82 is at a position in alignment with the lift lever 23 so that its upper end may be pivotally connected to the base of the lift lever as by a link 84. The lift lever 23 is pivotally mounted upon a lug 85 upstanding from the top 20. The pivotal connection 86 in the lug is at the end of the lever and at a corner of the lug, while the pivotal connection 87 in the lever 23 connects with the link 84 at a location on the lever which permits a toggle action when the lever 23 is depressed towards the top of the frame 20 as best shown at FIG. 9. An excessive movement of the lift lever, as to touch the top 20a, is prevented by the corner 88 of the lug engaging a shoulder 89 on the lift lever as shown at FIG. 11.

When the lift lever 23 is depressed to the toggle-locked position, as shown at FIG. 9, the frame 20 is raised so that the impact arms 25 are above the ground surface and at an idle position. When the lift lever is raised, the frame 20 lowers to permit the impact arms to cut into the ground surface below the machine. This lowering action of the machine, by lifting the lever 23, must be adjustable to meet different ground conditions. A simple adjustment head 90 is provided to vary the height to which the lever may be lifted. The head 90 is carried upon a C-shaped frame 91 mounted upon the frame top 20a immediately adjacent to the lug 85 at a position where the end 89' of the shoulder 89 may engage the head. An upright adjusting screw 92 is carried by the arms 91' of the C-lever as in holes 93 therein. This adjusting screw 92 is held in position by a pin 94 extending through the screw and bearing against a thrust washer 95 at the underside of the upper arm 91' and a compression spring 96 about the screw bearing against the top side of the upper arm 91'. The compression spring is held in place by a knob 97 at the top of the adjusting screw 92. To complete this head 90, a lug 98, carried upon the adjusting screw between the arms of the C-frame 91, is proportioned to engage the end 99 of the shoulder 89 of the lever 23, as best illustrated at FIG. 11.

Vibration of the lawn comber is severe when it is in operation and one common problem is that the height adjustment will change. Screw type adjustments, to provide a wide variation of settings, are desirable but the screw adjustments and screw-type locks commonly used in connection with lawn combers invariably shake loose with the locks ruining the threads of the adjusting screw. It was found, however, with the corner 99 of the shoulder 89 bearing against one side of the lug 98, the off-center pressure locks the system in such a manner as to hold a given setting regardless of the vibration encountered.

We have now described out invention in detail. However, it is obvious that others skilled in the art can build and devise alternate and equivalent constructions which are nevertheless within the spirit and scope of our invention. Hence, we desire that our protection be limited, not by the contructions illustrated and described, but only by the proper scope of the appended claims.

What is claimed is:

1. In combination with a lawn comber, or the like, having a rearward discharge chute wherethrough debris is discharged with the exit portion of the discharge chute being a generally rectangular opening formed by an upper plate, a lower plate and sidewall plates, a debris bag attached to said exit portion to extend rearwardly therefrom to receive debris, and comprising:
    a. a body of pliable, cloth-like sheet material having a generally rectangular bottom disposed near the ground surface below the exit portion of the discharge chute, a front wall extending upwardly from the front edge of the bottom and to said lower plate, side walls extending upwardly from the respective side edges of the bottom to a top edge portion above the top of the discharge chute with the front edges of the side walls at the adjacent sides of said sidewall plates and a rear wall extending upwardly from the rear edge of the bottom to the top edges of the sidewalls to complete the bag form, and
    b. a bag frame including an upright section attached to the exit portion of the discharge chute and a bag supporting section having rearwardly extended longitudinal top rods connected by a rear transverse cross rod, corresponding with the bag form, being cantilevered from the top of the upright section and being connected with the top edge portions of the sidewalls and rear wall of the bag body to suspend the bag body in an open debris-receiving position.

2. The combination defined in claim 1, wherein:
said upright section of the frame includes top and bottom cross rods and upright side rods proportioned to embrace the exit portion of the discharge chute, and with the front wall of the bag body connecting with the bottom cross rod and the front edges of the sidewalls of the bag body connecting with the respective side rods, whereby the upper, lower and sidewall plates of the exit portion of the chute extend a short distance into the bag body.

3. The combination defined in claim 2, wherein:
said rearwardly extended longitudinally top rods are connected to the upper portion of said upright section of the frame and rearwardly extended longitudinal strut rods are connected to the lower portion of the aforesaid upright section of the frame to connect with the longitudinal top rods near the rear portion of the frame to reinforce the same.

4. The combination defined in claim 1, wherein the lawn comber includes:
a U-shaped pushhandle with side bars extending rearwardly and upwardly from each side of the lawn comber to terminate at a rearward transverse pushbar, and wherein:
said top rods extend rearwardly and upwardly alongside and between the side bars of the push handle and with said transverse crossrod being adjacent to the pushbar of the push handle.

5. The combination defined in claim 2, wherein:
the chute is inclined upwardly towards its exit; and
said top cross rod of the upright section lies upon the upper edge of the said chute with the chute inclination locking said top cross rod in place to hold the bag when the weight of the bag body pulls the frame downwardly and against the chute exit, but permits the bag to be easily lifted from the chute exit.

6. The combination defined in claim 5, including:
a cover of cloth-like sheet material adapted to be fitted over the top of the bag, said cover being attached to the rear wall of the body to be extended forwardly above the top rods of the frame; and
a second cross rod on the frame adjacent to the aforesaid top cross rod to receive the front edge of the cover.

7. The combination defined in claim 1, including:
a wheel-mounted support pan connected to the lawn comber beneath the bag to facilitate supporting the bag when it is filled with debris.

8. The combination defined in claim 7, wherein:
said support pan is pivotally connected to the lawn comber near the front end of the bag to permit the support pan to swing upwardly towards the bag frame to collapse the bag carried upon it or to permit the lawn comber to tip rearwardly with the bag collapsing upon the pan.

9. The organization defined in claim 2, wherein said lawn comber includes:
an actuating lever adapted to be shifted to operate the comber against a bias towards and past the chute exit to lie alongside the bag when the bag is in place on the lawn comber; and
a finger on the frame bag adapted to engage and hold the lever when so shifted for operation of the lawn comber, whereby the lever cannot be held for operation of the lawn comber unless the bag is properly positioned upon the lawn comber.

* * * * *